Jan. 28, 1964  S. COOK ETAL  3,119,548
PLASTIC BAGS
Filed June 8, 1961  3 Sheets-Sheet 1
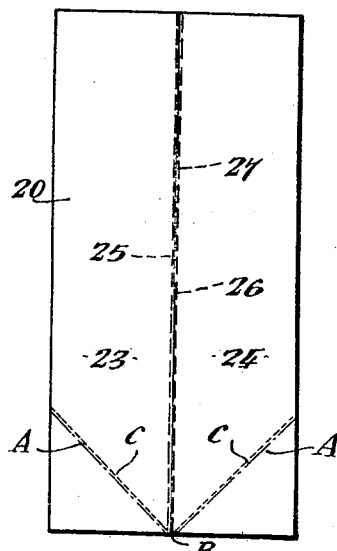
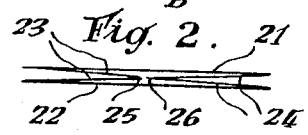
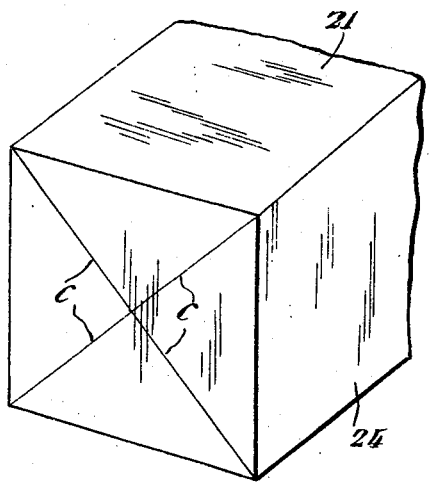
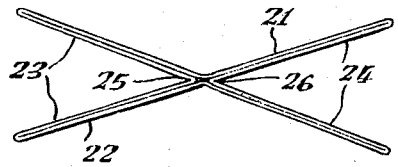
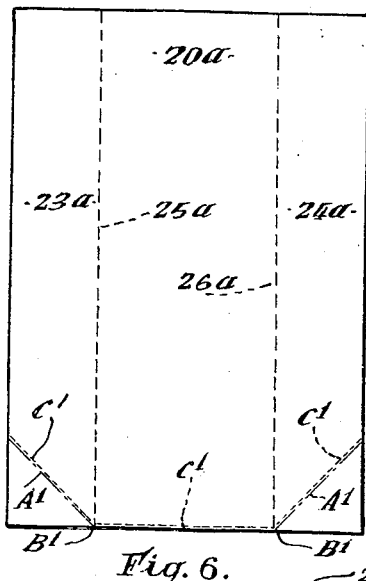
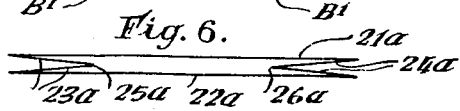
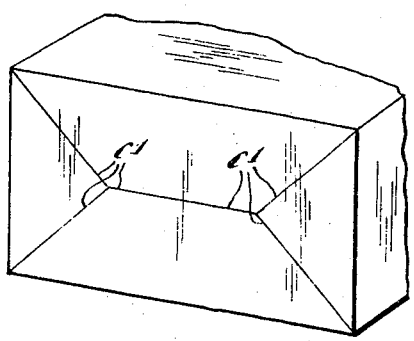
INVENTORS
SIDNEY COOK
BERNARD WLTON CRAWSHAW Jan. 28, 1964  S. COOK ETAL  3,119,548
PLASTIC BAGS Filed June 8, 1961  3 Sheets-Sheet 2

INVENTORS
SIDNEY COOK
BERNARD WILTON CRAWSHAW
BY
ATTORNEY

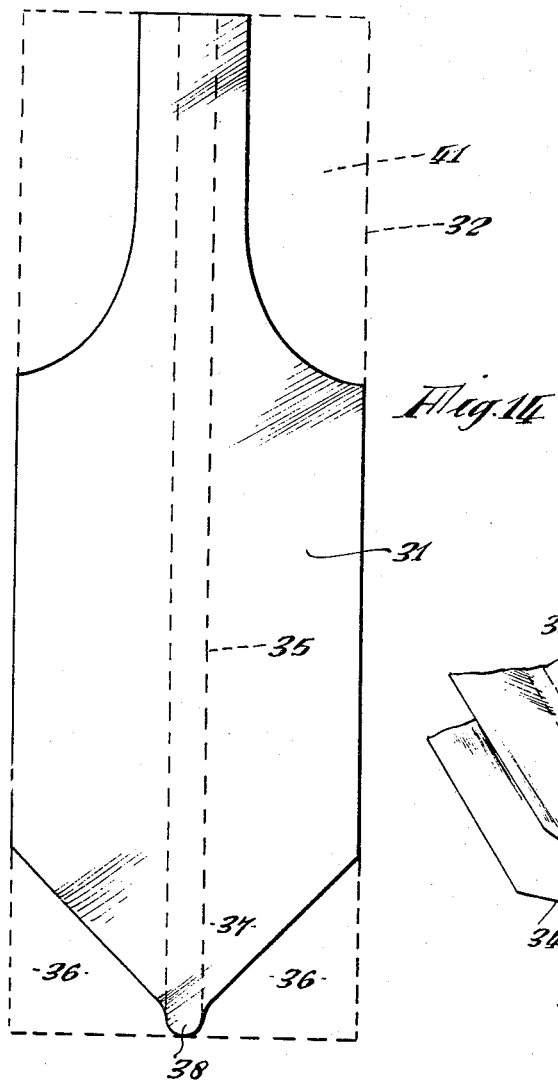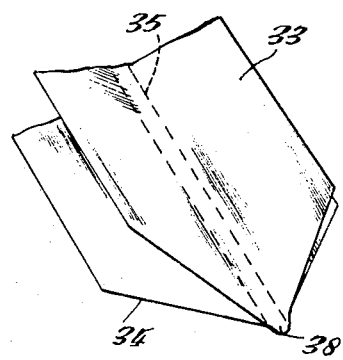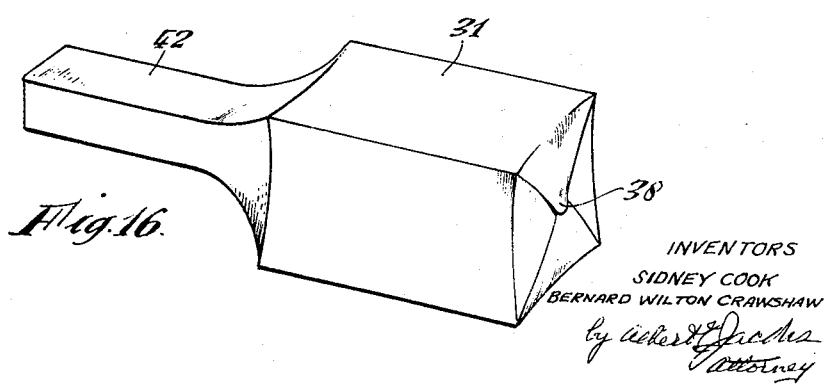

3,119,548
PLASTIC BAGS
Sydney Cook, Monk Bretton, Barnsley, and Bernard
Wilton Crawshaw, Smithies, Barnsley, England, assignors to Dale Products (Plastics) Limited, Barnsley, England, a company of Great Britain and Northern Ireland
Filed June 8, 1961, Ser. No. 115,749
4 Claims. (Cl. 229—53)

The invention relates to plastic bags and to the manufacture thereof.

The invention provides a bag formed of flexible, heat sealable plastic material and open at one end, which bag, when in a flattened condition, comprises a single sheet of plastic material overlying a similar second sheet and at least one re-entrant fold therebetween constituting a gusset connecting the two sheets together along one edge of the bag, the flattened bag tapering in width towards the closed end of the bag and having at least parts of the margins of the tapering portions of the over and underlying sheets respectively heat sealed to the registering margins of the over and underlying webs of the fold.

The invention also provides a method of forming bags from a continuous tube of heat sealable plastic material flattened to form two opposed re-entrant folds disposed between and connecting two similar single layers of plastic material, which method comprises making two severing cuts through the flattened tube at positions spaced apart along the length of the tube to separate an individual bag blank from the continuous tube, one of said cuts severing the flattened tube over the portions of the tube width corresponding to the gussets along lines diagonally to the length of the tube and at an angle to one another, and heat sealing the registering contiguous edges of the blank formed by said one cut to form a gusseted bag.

The invention further provides a method of forming bags from a continuous tube of heat sealable plastic material flattened to form two opposed re-entrant folds of small width disposed between and connecting two similar single layers of plastic material, comprising making pairs of severing cuts in the flattened tube at intervals along the length thereof diagonally across and within the limits of each fold so as to cut-out transversely aligned, substantially triangular-shaped pieces from opposite edges of the flattened tube, making parallel severing cuts across the flattened tube from the apices of the triangular cut-outs at one side of the flattened tube to the apices of the triangular cut-outs at the other side of the flattened tube, cutting the blank longitudinally intermediate of its width to form a plurality of separate bag blanks and heat sealing the registering juxtaposed edges of each bag blank at the fold and at the side edges to form a gusseted bag.

In order that the invention may be clearly understood and readily carried into effect, reference will be made to the accompanying drawings in which several forms of the invention are shown by way of example and in which:

FIGURE 1 is an elevation of one form of bag blank which has been cut from a longer length of such a blank;

FIGURE 2 is a plan of same;

FIGURE 3 is a perspective part view of a bag made from the blank of FIGURES 1 and 2;

FIGURE 4 is an enlarged underneath plan of the bag blank;

FIGURE 5 is an elevation of an alternative form of bag blank which has been cut from a longer length of such alternative form of blank;

FIGURE 6 is a plan of same;

FIGURE 7 is a perspective part view of a bag made from the blank of FIGURE 5;

FIGURE 14 is an elevation of another form of bag blank and the portion of a longer length of tube from which it has been cut;

FIGURE 15 is a perspective part view of the bag blank shown in FIGURE 14;

FIGURE 16 is a perspective view of a bag made from the blank of FIGURE 14.

Figure 8:
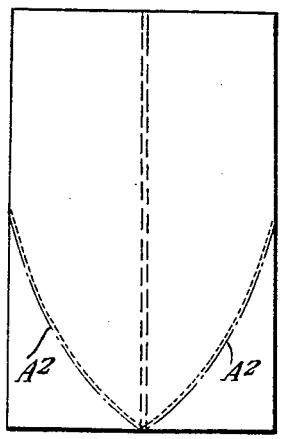
FIGURE 8 is a similar form of bag blank to that of FIGURE 1 from which a modified form of bag can be made.

In FIGURES 1 and 2 there is shown a bag blank 20 which has been severed transversely from a preformed one-piece longer length of blank to the required linear dimension for the required size of bag, the blank being a flattened tubular blank consisting of two single layers 21, 22, one overlying the other, with two oppositely disposed re-entrant folded layers 23, 24, therebetween constituting gussets connecting said single layers 21, 22, together throughout their length at the sides thereof, the medial folds 25, 26 of the two gussets lying substantially at the centre line 27 of the blank.

In forming a bag from the bag blank of FIGURES 1 and 2, two angular cuts are made therein at one end, as shown by the lines A in FIGURE 1, thus severing the corners of the blank at the bottom thereof across the gussets 23, 24, to the medial fold of each said gusset, each cut being made at 90° the one to the other and each being at 45° to the centre line 27 from opposite sides of the blank to the point B to form what is to be the bottom of the bag, with the upper end of the blank 20 forming the mouth thereof.

As will be seen in FIGURE 4, there are two pairs of exposed edges at each side of the centre line of the blank at the bottom thereof and each edge of a pair is welded, as by heat-sealing, the one to the other, to close the bottom of the blank, as indicated by the lines C in FIGURES 1 and 3, and form a bag with side gussets, so that when opened out it is of square cross section with a flat base, as shown in FIGURE 3.

In FIGURES 5, 6 and 7 an alternative form of bag blank 20a is shown which has also been severed transversely from a longer length of flattened tubular blank which, although somewhat similar to that from which the bag blank of FIGURES 1 to 4 has been severed, differs therefrom in that the gussets 23a, 24a, between the single layers 21a, 22a have their medial folds 25a, 26a spaced apart a distance approximately equal to half the width of the flattened tubular blank.

In forming a bag from such blank, two angular cuts $A^1$ are made at the bottom of said blank at 45° across each corner and each gusset 23a, 24a, to the medial fold thereof as seen as $B^1$ in FIGURE 5, to form what is to be the bottom of the bag.

The closely adjacent opposing edges formed as a result of the cuts are welded together as indicated by the lines $C^1$ in FIGURE 7 to close the bottom of the blank and form a bag with side gussets so that when opened out the resultant bag is oblong in cross section.

Figure 10:
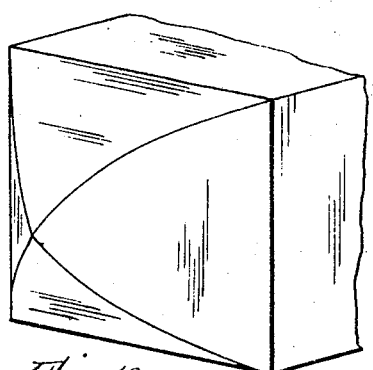
FIGURE 10 is a perspective part view of the modified form of bag made from the blank of FIGURE 9.
Figure 9:
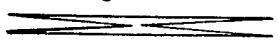
FIGURE 9 is a plan of same.

FIGURES 8, 9 and 10 illustrate a variation in the form of bag which can be made from the blank shown in FIGURE 1 by making arcuate cuts $A^2$ instead of the straight cuts A in FIGURE 1, the resultant bag, although of square cross section, has approximately a domed base, as shown in FIGURE 10.

Figure 12:
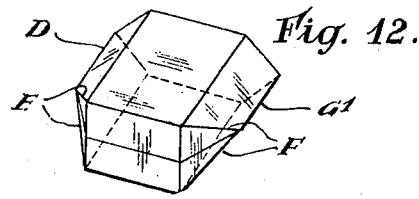
FIGURE 12 is a perspective part view of one form of bag made from the blank of FIGURE 11.
Figure 11:
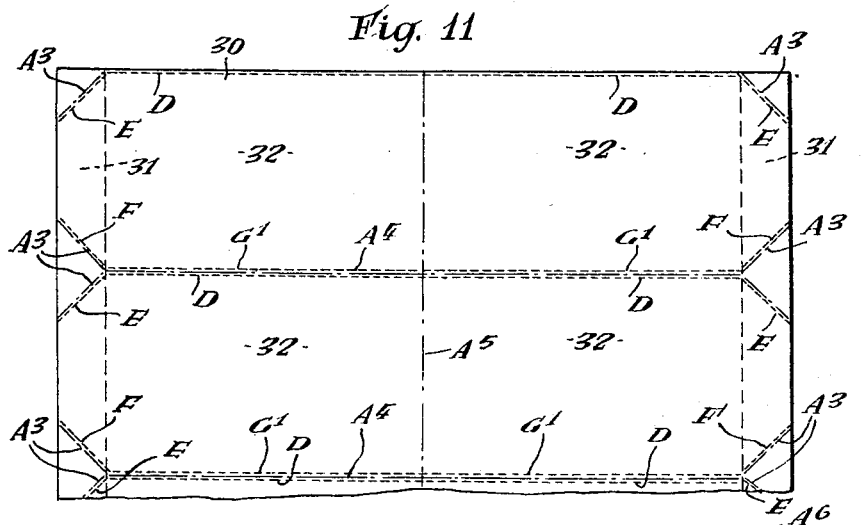
FIGURE 11 is an elevation of a further alternative form of blank.

FIGURE 11 shows a length of tubular blank 30 having very narrow or shallow gussets 31. From this blank a number of bag blanks 32 are severed therefrom by making straight angled cuts $A^3$ across the gussets 31, transverse cuts $A^4$ and a central longitudinal cut $A^5$. The exposed closely adjacent opposing edges of each bag blank are then welded as indicated by the lines D, E, F and $G^1$ to form bags having a gusseted base, of which one is shown in FIGURE 12 and which has an oblong base substantially similar to the bag of FIGURE 7 except that all the welds D, E, F and $G^1$ are at the sides of the bag instead of at the base thereof.

Figure 13:
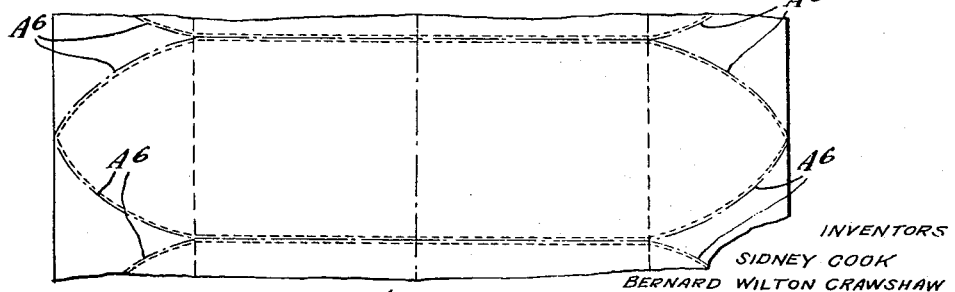
FIGURE 13 is an elevation of a still further alternative form of blank.

Instead of the angle cuts $A^3$ being straight, they may be arcuate as shown at $A^6$ in FIGURE 13 which shows a similar blank to that of FIGURE 11 but having wider gussets.

In FIGURE 14 there is shown in a flattened condition a bag 31 which has been severed from a preformed one-piece flattened plastic tube 32. The bag 31 consists of two single layers 33, 34, one overlying the other, with two oppositely disposed re-entrant folded layers therebetween constituting gussets 35 connecting the layers 33, 34 together along the sides of the bag. Substantially triangular shaped corner portions 36 of the layers 33, 34 at the closed end of the bag 31 are cut-away so that corresponding portions of those layers 37 at that end of the bag taper and decrease in width towards an apex. The layers 33, 34 are however extended locally in the region of the apex to provide a small outward protuberance 38 at the centre line of the bag. The gussets 35 are also cut away so that their severed edges register with the severed edges of the layers 33, 34. The margin of the layer 33 is welded to the margin of the upper web of the gusset 35 and the margin of the layer 34 is welded to the margin of the lower web of the gusset 35. Between the gussets 35, the margins of the protuberances 38 are welded together.

Two elongated corner pieces 41 of the layers 33, 34 at the open end of the bag and the corresponding portions of the gussets 35 are also cut away. Again the margins of the layer 33 are welded to the margins of the upper webs of the gussets 35 and the margins of the layer 34 are welded to the margins of the lower webs of the gussets 35. A neck 42 is thus formed.

FIGURE 15 shows a bag made from the blank shown in FIGURE 14, in an extended or inflated condition. The protuberance 38 increases the strength of the bag. The bag shown in FIGURE 15 is particularly suitable for containing so-called "soft" ice cream, that is ice-cream that has been made but which has not been frozen. The plastic bag 31 is usually contained within an outer (e.g. cardboard) container. The neck 42 facilitates handling of the bag.

The blanks may be of extruded polythene or other suitable plastic material.

In all forms of the invention as illustrated, bags are fabricated from a flattened tubular blank having oppositely disposed side gussets throughout its length substantially as hereinbefore described in which the medial folds of the gussets are either disposed back-to-back approximately at the centre line of the blank or at equidistant points spaced therefrom, two severing cuts of straight or arcuate form which completely remove parts from the blank being made at an angle to one another, either one in each oppositely disposed gusset, or both in the same gusset at that part of the blank which is to become the bottom of a bag, the open edges resulting from said severing cuts being subsequently welded as by heat-sealing.

What we claim and desire to secure by Letters Patent is:

1. A bag of heat sealable plastic material open at one end and comprising an overlying sheet and an underlying sheet connected at their opposite sides by folded gussets forming a flat tube, diagonal seams adhering each said sheet to an adjacent gusset fold to form an end closure and said seams converging towards an apex but diverging threat to form a protuberance at the center line of the bag.

2. A fluid-tight container comprising two flat sheets of deformable material and two parallel and oppositely disposed re-entrant folds between said sheets constituting gussets connecting adjacent edges of said sheets, the two flat sheets having lower ends tapering towards an apex and the re-entrant folds being similarly shaped, the severed edges of the gussets registering with converging edges of the under and overlying sheets, being respectively heat sealed to the contiguous edges of said sheets, the two flat sheets being extended locally in the region of the apex to provide a small outward protuberance at the center line of the container for reducing the stress in the region of said apex when the container is in use.

3. A fluid-tight container according to claim 2, wherein the medial fold lines of the gussets lie a small distance apart on opposite sides of the center line of the flattened container, the contiguous edges of the under and overlying sheets between the medial fold lines being heat sealed together in a manner providing the small outward protuberance for reducing the stress in the region of the apex when the container is in use.

4. A fluid-tight container according to claim 3, wherein the under and overlying sheets are of less width than the maximum width towards their upper ends, the width of the re-entrant folds being similarly reduced and the contiguous severed edges being heat sealed together to form an elongated open ended neck to the bag.

References Cited in the file of this patent

UNITED STATES PATENTS

| | | |
|---|---|---|
| 277,153 | Onderdonk | May 8, 1883 |
| 1,149,872 | Schmidt | Mar. 7, 1939 |
| 2,265,075 | Knuetter | Dec. 2, 1941 |
| 2,432,122 | Pardee | Dec. 9, 1947 |
| 2,628,013 | Vogt | Feb. 10, 1953 |
| 2,673,024 | Kuss | Mar. 23, 1954 |
| 2,821,337 | Morgan | Jan. 28, 1958 |
| 3,003,681 | Orsini | Oct. 10, 1961 |
| 3,004,698 | Ashton | Oct. 17, 1961 |
| 3,009,498 | Fohr | Nov. 21, 1961 |

FOREIGN PATENTS

| | | |
|---|---|---|
| 1,055,074 | France | Oct. 14, 1953 |